(12) United States Patent
Berthold et al.

(10) Patent No.: US 8,148,588 B2
(45) Date of Patent: Apr. 3, 2012

(54) PROCESS FOR PREPARING POLYOLEFINS IN SUSPENSION

(75) Inventors: Joachim Berthold, Kelkheim (DE); Frank Peter Alt, Frankfurt (DE); Kaspar Evertz, Sulzbach (DE); Peter Kölle, Köln (DE)

(73) Assignee: Basell Polyolefine GmbH, Wesseling (DE)

( * ) Notice: Subject to any disclaimer, the term of this patent is extended or adjusted under 35 U.S.C. 154(b) by 835 days.

(21) Appl. No.: 10/589,048

(22) PCT Filed: Jan. 25, 2005

(86) PCT No.: PCT/EP2005/000708
§ 371 (c)(1),
(2), (4) Date: Jun. 11, 2007

(87) PCT Pub. No.: WO2005/077992
PCT Pub. Date: Aug. 25, 2005

(65) Prior Publication Data
US 2007/0276170 A1      Nov. 29, 2007

Related U.S. Application Data

(60) Provisional application No. 60/550,189, filed on Mar. 4, 2004.

(30) Foreign Application Priority Data

Feb. 11, 2004   (DE) .......................... 10 2004 006 817

(51) Int. Cl.
C08F 10/00     (2006.01)
C08L 23/08     (2006.01)
C08L 23/14     (2006.01)

(52) U.S. Cl. .............. 585/315; 585/18; 526/64; 526/65; 526/75; 526/95; 526/114; 526/116; 526/118; 526/160; 526/351; 525/313; 525/314

(58) Field of Classification Search ................... 585/18, 585/315; 526/64, 65, 75, 95, 114, 116, 118, 526/160, 351; 525/313, 314
See application file for complete search history.

(56) References Cited

U.S. PATENT DOCUMENTS

| 4,337,069 A * | 6/1982 | German et al. ................. 96/266 |
| 5,177,153 A * | 1/1993 | Liebermann et al. ......... 525/314 |
| 5,769,927 A | 6/1998 | Gottschlich et al. |
| 6,225,421 B1 | 5/2001 | Promel et al. |
| 2002/0128401 A1 | 9/2002 | Job et al. |
| 2003/0191251 A1 | 10/2003 | McGrath |

FOREIGN PATENT DOCUMENTS

| WO | WO 96/27634 | 9/1996 |
| WO | WO 02/28922 A1 * | 4/2002 |

* cited by examiner

Primary Examiner — Prem C Singh
(74) Attorney, Agent, or Firm — Dilworth IP, LLC

(57) ABSTRACT

The invention relates to a continuous process for preparing polyolefins having a bimodal or multimodal molar mass distribution in suspension in at least two reactors R1, R2.x, R3.y which are connected in series and in which different reaction conditions are set. In this process, the offgases A1, A2.x, A3.y, A4 and A5 leaving all the reactors connected in series are firstly collected, the collected offgases are then compressed in a compression stage 10, the compressed offgases are subsequently cooled and the cooled material is separated into a gaseous fraction and a liquid fraction. The separated fractions are then recirculated to the polymerization process at different points. The process of the invention allows the total conversion of the polymerization, based on monomer and comonomer used, to be increased to a surprising extent.

11 Claims, 5 Drawing Sheets

PROCESS FOR PREPARING POLYOLEFINS IN SUSPENSION

The present invention relates to a continuous process for preparing polyolefins having a bimodal or multimodal molar mass distribution in suspension in at least two reactors which are connected in series and in which different reaction conditions are set.

In known processes for preparing polyolefins having a bimodal or multimodal molar mass distribution, monomers and hydrogen are firstly polymerized in the presence of a suspension medium and a suitable catalyst, preferably a Ziegler catalyst, in a first reactor under first reaction conditions and the reaction mixture is then transferred to a second reactor and polymerized further there under second reaction conditions, then, if desired, transferred to a further reactor and there polymerized further under further reaction conditions, and so forth, with the first reaction conditions differing from the second and the further reaction conditions so that they lead to polyolefins having differing molar masses.

The total yield, based on monomer and comonomer used, in the known suspension polymerization processes is, as a function of an optimal polymerization formulation, in the range from 96 to 98%. An after-reactor which is installed downstream of the last polymerization stage and in which the output obtained from the individual polymerization stages is treated once again under reaction conditions enables the total yield to be increased further and brought to a value in the range from 98 to 99.5%.

However, an after-reactor always represents a considerable additional capital cost and it is particularly prone to malfunctions in operation, which is regarded as a serious drawback in industry.

SUMMARY OF THE INVENTION

It is therefore an object of the present invention to modify the known process of polymerization of olefins in suspension so that an after-reactor is avoided but a total yield, based on olefin monomer and comonomer used, of more than 98%, preferably more than 99%, can nevertheless be achieved in the polymerization.

This object is achieved by a process of the generic type mentioned at the outset in which the offgases leaving all the reactors connected in series are collected, the collected offgases are then compressed by means of a compressor, the compressed offgases are subsequently cooled and the cooled material is separated into a gaseous fraction and a liquid fraction and the separated fractions are then recirculated to the polymerization process at different points.

The collected offgases are preferably compressed to a pressure in the range from 0.5 to 2.5 MPa, preferably in the range from 0.9 to 2.0 MPa, and in the process heat up to temperatures in the range from 30 to 250° C. Compression of the offgases can be carried out by means of single-stage or multistage compression. In a multistage compression, cooling of the offgases can be carried out after the individual stages.

The compressed offgases are subsequently cooled to a preferred temperature in the range from 0 to 100° C., particularly preferably in the range from 20 to 50° C. At a pressure in the range from 0.5 to 2.5 MPa, a liquid phase and a gaseous phase are then formed and these are collected in a vessel from which they can subsequently be taken off separately. Cooling of the compressed offgases can also be effected by sprinkling with previously cooled liquid phase in a gas scrubber.

The polymerization process of the invention is preferably carried out in the presence of a Ziegler catalyst. The appropriate molar mass of the polymer fraction prepared in the various reactors is preferably set by addition of hydrogen to the reaction mixture. The polymerization process is preferably carried out so that the highest hydrogen concentration and the lowest comonomer concentration, based on the amount of monomer, are set in the first reactor. In the downstream further reactors, the hydrogen concentration is gradually reduced and the comonomer concentration is altered, in each case once again based on the amount of monomer. Preference is given to using ethylene or propylene as monomer and an alpha-olefin having from 4 to 10 carbon atoms as comonomer.

Suitable suspension media are saturated hydrocarbons having from 4 to 12 carbon atoms and a mixture of these, which is also known as diesel oil.

Since the Ziegler catalyst generally suffers a decrease in its polymerization activity as the hydrogen concentration increases and because the suspension inevitably becomes increasingly diluted as the total conversion increases, the reacting polymer particles in the first reactor have the longest mean residence time. For this reason, the highest conversion of the added monomer to homopolymer or of the added monomer and comonomer to copolymer is achieved in the first reactor, compared to the downstream reactors.

In the accompanying figures, the invention is illustrated by way of example.

BRIEF DESCRIPTION OF THE DRAWINGS

In FIG. 1, the successive reactors R1, R2.x, R3.y and R4, where x=0, 1, 2, ... and y=0, 1, 2, ..., are denoted by reference numerals. The reactors can, according to the invention, be fill-level-regulated reactors in which the polymerization is carried out in a suspension medium at a pressure in the range from 0.01 to 1.6 MPa, at a temperature in the range from 60 to 120° C. and with good mixing by means of a stirrer. The contents of the reactors can be cooled or heated via a jacket, which has been omitted in the schematic diagram. As an alternative, the reactors can be connected to one or more external cooling circuits (likewise not shown in the figure) in the region of which the reactor contents which are being circulated by means of pumps are heated or cooled.

Figure 1:
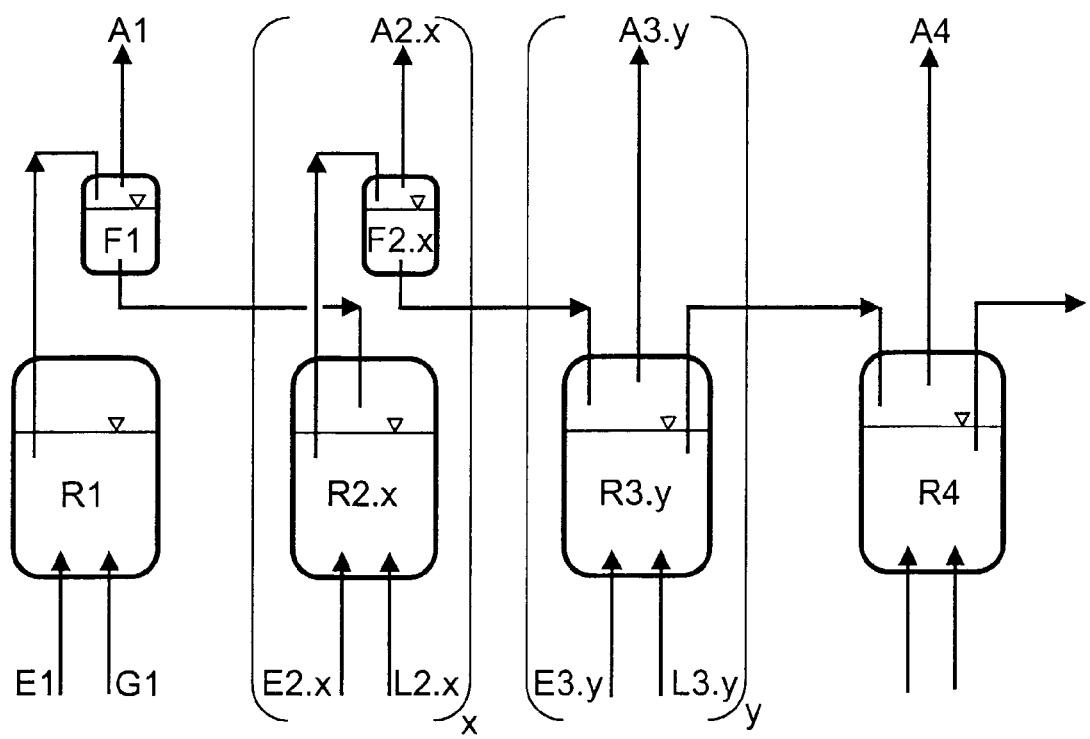
FIG. 1 shows a flow diagram of a multistage polymerization in a plurality of reactors connected in series.

The contents of a reactor can be discharged directly through a regulatable or valve, either continuously or discontinuously, into the next, downstream reactor or into the product work-up P when the pressure difference between the respective reactors or the product work-up P permits this. However, the reaction mixture can also be discharged from one or more of the abovementioned external cooling circuits from the pressure side through a regulatable valve.

The reference numerals F1 and F2.x, where x=0, 1, 2, ..., denote fill-level-regulated intermediate vessels in which a defined pressure and a defined temperature prevail. These intermediate vessels F1 and F2.x serve to partly degas the reaction mixture. Hydrogen and inert gases which, for example, go into solution from inert gas blanketing of stock vessels for suspension media or comonomers or are fed in as secondary constituents with the monomer or are formed by means of secondary reactions in the reactors R1 and R2.x can be removed in the intermediate vessels F1 and F2.x to make it possible for the reaction conditions in the polymerization in the downstream reactor R2.x and R3.y to be controlled precisely. The intermediate vessels F1 and F2.x can be operated with or without a stirrer. The intermediate vessels F1 and F2.x can have a jacket for cooling or setting the temperature, but can also be connected to external cooling circuits.

The contents of the intermediate vessels F1 and F2.x can be discharged directly through a regulatable valve, either continuously or discontinuously, into the next, downstream reactors R2.x and R3.y when the pressure difference between the respective intermediate vessel F1 and F2.x and the respective reactors R2.x and R3.y permits this. However, the reaction mixture can also be discharged from one or more of the abovementioned pump-operated external cooling circuits from the pressure side through a regulatable valve.

The reference numerals E1, E2.x and E3.y, where x=0, 1, 2, ..., and y=1, 2, 3, ..., denote the streams into the reactors R1, R2.x and R3.y. The streams E1, E2.x and E3.y into the reactors R1, R2.x and R3.y are composed of difference proportions of suspension medium, catalyst, cocatalyst, monomer, comonomer, hydrogen and inert gases, with the proportion of one or more of the individual components also being able to be zero. The individual components of the streams E1, E2.x and E3.y can be fed individually or as a mixture, either continuously or discontinuously, into the reactors R1, R2.x and R3.y at one or more points via regulatable valves.

In FIG. 1, the reference numerals A1, A2.x, A3.y and A4, where x=0, 1, 2, ... and y=0, 1, 2, ..., denote offgas streams which are branched continuously or discontinuously from the gas phases of the reactors R1, R2.x, R3.y and R4 via regulatable valves (not shown). The offgas lines, which are not shown in the figure, can additionally contain a cooling apparatus between the reactors R1, R2.x, R3.y and R4 and the regulatable valve. The constituents of the offgas streams A1, A2.x, A3.y and A4 are varying amounts of hydrogen, inert gas, unreacted monomer or comonomer or vaporized suspension medium, with one or more constituents also being able to be present in only a very small amount or be completely absent.

FIGS. 2A, 2B, 2C and 2D schematically show how the offgas streams A1, A2.x, A3.y, A4 and A5 are processed according to the invention. The offgas streams A1, A2.x, A3.y and A4 are denoted by the same reference numerals which have been employed in FIG. 1. The reference numeral A5 denotes the total offgases which are obtained in the product work-up P, which is not shown in detail. In a vessel denoted by the reference numeral R5, all offgas streams A1, A2.x, A3.y, A4 and A5 are firstly combined and mixed. The vessel R5 can also, if required, take in additional gas streams of gaseous or vaporized monomer M or inert gas I from a possible compressor bypass from an upstream pressure stage.

From the vessel R5, the collected offgases are passed on via the line Q to the compression stage 10 and subsequently to the cooling stage 11 and from there go to the pressure vessel R6, which in the figure is provided with an external cooling jacket 12. The cooling stage 11 can comprise one or more cooling apparatuses by means of which stepwise cooling is possible. According to the invention, it is possible to set conditions in the pressure vessel R6 which are such that the individual components comonomer and vaporized suspension medium present in the offgas streams A1, A2.x, A3.y, A4 and A5 are virtually completely liquefied. Thus, the offgases are, according to the invention, fractionated in the pressure vessel R6 to form a gaseous phase G1 which comprises most of the inert gas, hydrogen and monomer and a liquid phase L which comprises predominantly comonomer and suspension medium.

Figure 2A:
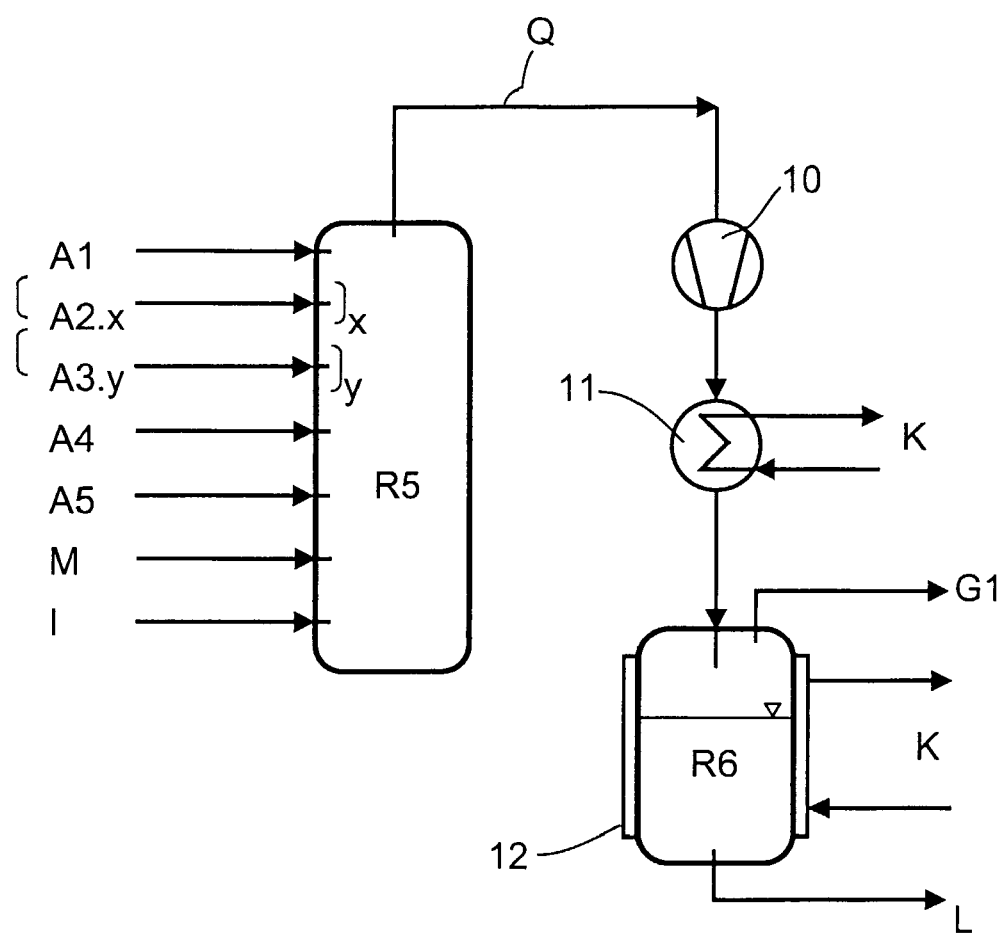
FIGS. 2A, 2B, 2C and 2D show individual flow diagrams for the offgas fractionation according to the invention.
Figure 2B:
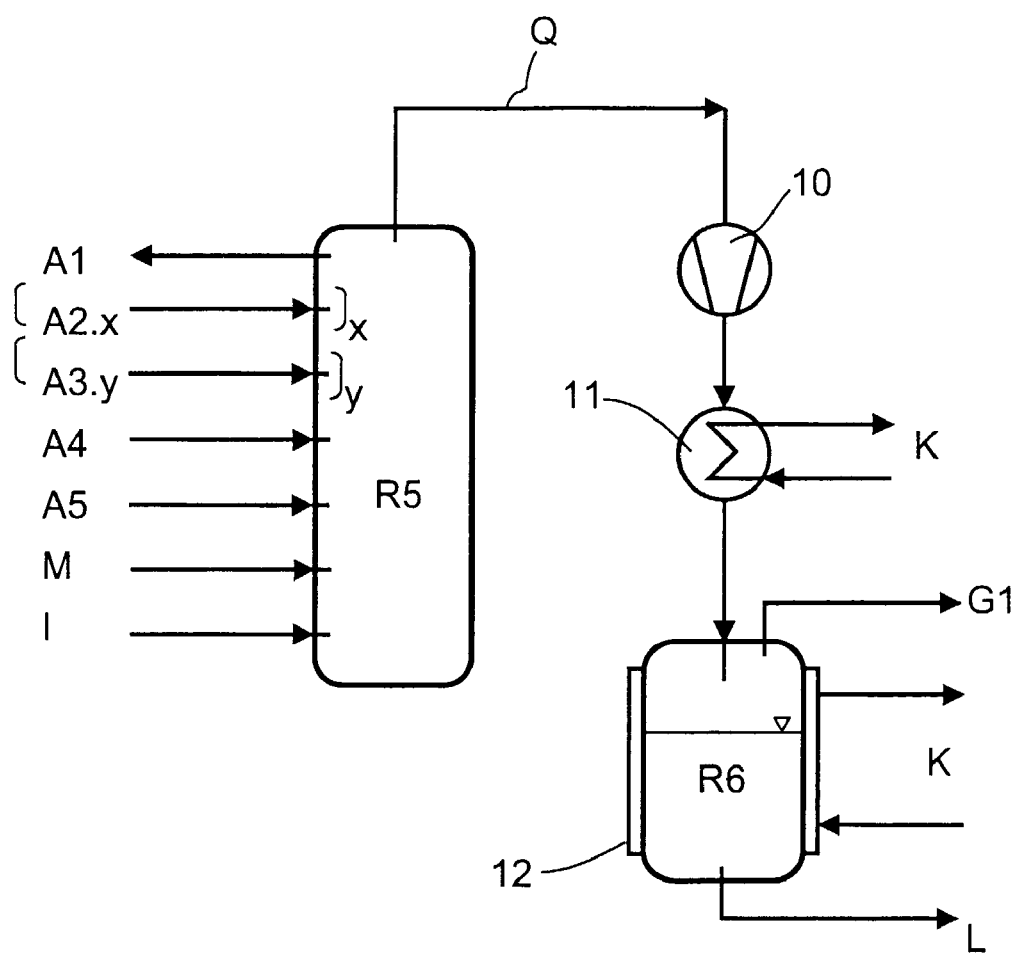
Figure 2C:
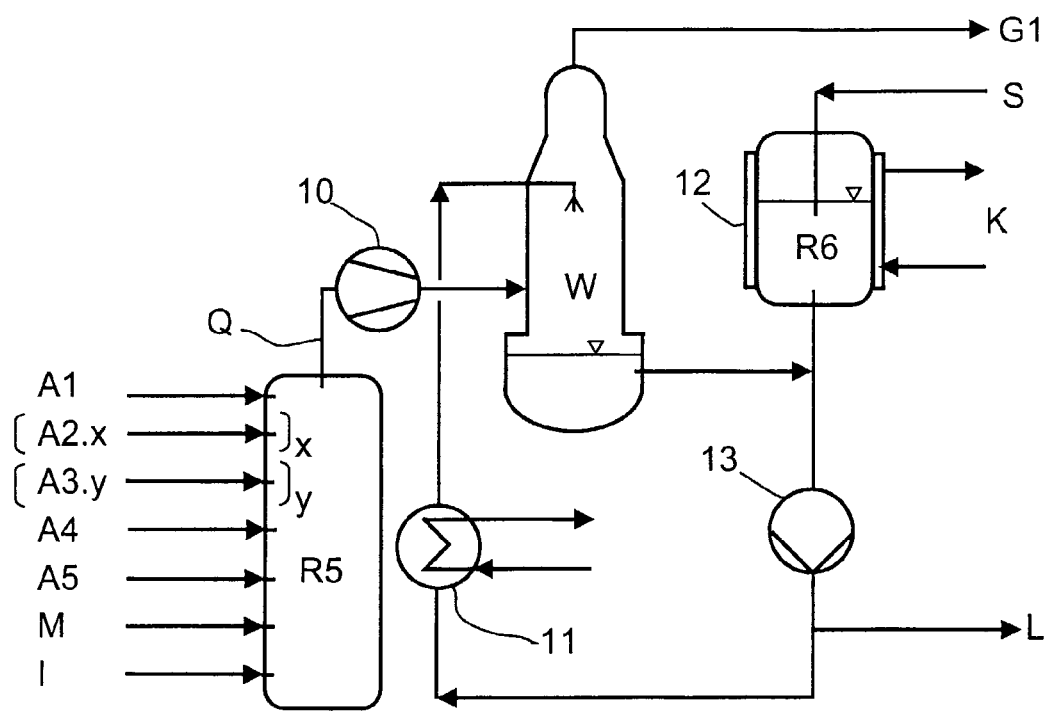
Figure 2D:
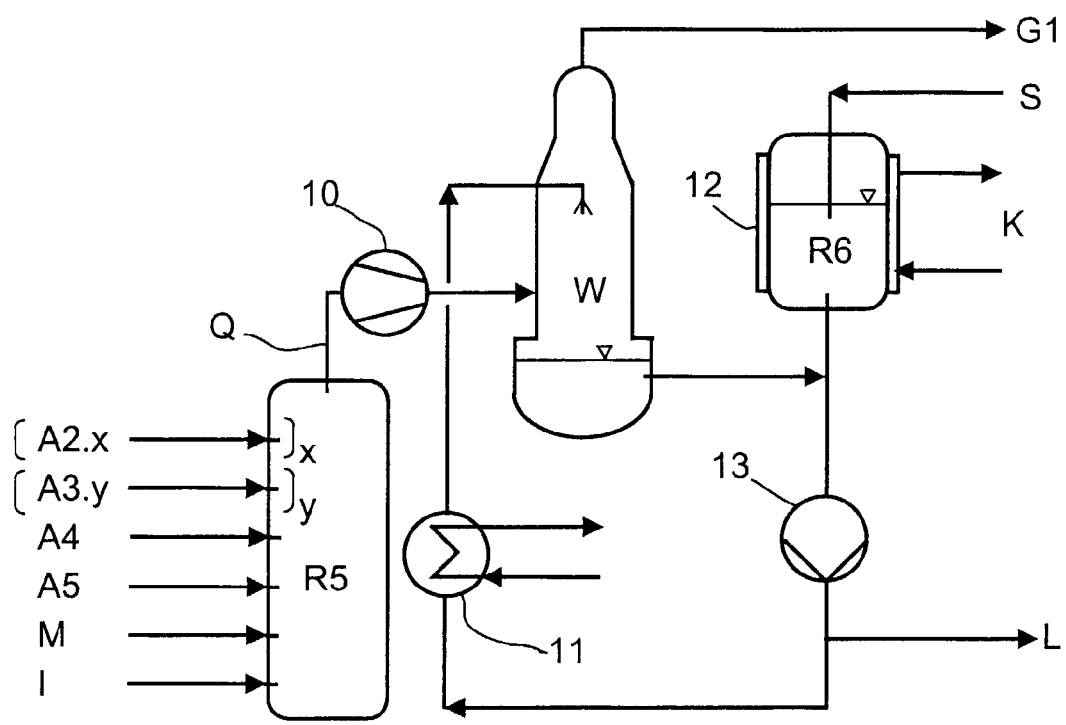

In a variant of the process of the invention shown in FIG. 2C, cooling of the compressed offgases can be carried out in a gas scrubber W by sprinkling with previously cooled, liquid phase. In this case, the liquid phase is circulated by means of the pump 13 and is cooled in the cooling stage 11. The pressure vessel R6 then serves as equalizing vessel for the liquid phase with the line S for first filling.

The gaseous phase G1 is recirculated continuously or discontinuously via regulatable valves (not shown) to the reactor R1 of the first reaction stage, while the liquid phase L is fed as total stream into one of the reactors R2.x or R3.y downstream of the first reactor R1. In a further variant of the invention, the liquid phase L can also be divided into substreams L2.x and L3.y and fed continuously or discontinuously into a plurality of reactors R2.x and R3.y.

In a further preferred variant of the process of the invention shown in FIG. 2B, the offgas stream A1 can be branched off separately from the circuit of the first reaction stage in reactor R1. The offgas stream A1 contains a particularly large proportion of hydrogen and inert gas and is particularly low in monomer and comonomer. This variant thus makes it possible to remove hydrogen and inert gas from the overall polymerization process in a targeted manner at one point.

FIG. 2D once again shows the preferred variant of the process of the invention using the gas scrubber W but without the offgas stream Al from the first reactor R1.

The process of the present invention with circulation of the offgas makes it possible for the monomer and comonomer used to be utilized better, and the total yield of polymer, based on monomer and comonomer used, increases to a value above 98%, preferably up to 99.75%.

The invention claimed is:

1. A continuous, suspension process for preparing polyolefin polymers having a bimodal or multimodal molar mass distribution from a monomer and at least one comonomer in the presence of a suspension medium in a first reactor and at least one downstream reactor which are connected in series and operated under different reaction conditions within each of the reactors, wherein an after-reactor is avoided and a total yield of more than 98% is obtained, the process comprises: collecting all offgases leaving the first reactor and the at least one downstream reactor; compressing the collected offgases to a pressure ranging from 0.5 to 2.5 MPa in a compression stage to produce compressed offgases; cooling the compressed offgases to produce a cooled offgas material comprising a gaseous fraction comprising an inert gas, hydrogen, and the monomer and a liquid fraction comprising the comonomer and the suspension medium; separating the cooled offgas material into the gaseous fraction and the liquid fraction; recirculating the gaseous fraction into the first reactor; and recirculating the liquid fraction into at least one of the downstream reactors, wherein the compressed offgases are cooled in a gas scrubber by contacting with at least a portion of the liquid phase fraction.

2. The process as claimed in claim 1, wherein the offgases are compressed to a pressure ranging from 0.9 to 2.0 MPa.

3. The process as claimed in claim 1, wherein the offgases heat up to a temperature ranging from 30 to 250° C. while the offgases are compressed.

4. The process as claimed in claim 1, wherein the compressed offgases are cooled to a temperature ranging from 0 to 100° C.

5. The process as claimed in claim 1, wherein the compressed offgases are cooled to a temperature ranging from 20 to 50° C.

6. The process as claimed in claim 1, wherein the cooled offgas material is separated at a pressure ranging from 0.5 to 2.5 MPa into the liquid fraction and the gaseous fraction, which are collected in a pressure vessel.

7. The process as claimed in claim 1, wherein the continuous, suspension process is carried out in the presence of a Ziegler-Natta catalyst and hydrogen.

8. The process as claimed in claim 1, wherein the first reactor contains hydrogen and at least one comonomer, the hydrogen concentration in the first reactor being higher than the hydrogen concentration in the downstream reactor, and the comonomer concentration in the first reactor being lower than the comonomer concentration in the downstream reactor.

9. The process as claimed in claim 1, wherein the continuous, suspension process produces at least one polyolefin polymer comprising ethylene or propylene, and from 0 to 10% by weight, based on a total weight of the polyolefin polymer, of at least one alpha-olefin comprising from 4 to 10 carbon atoms.

10. The process as claimed in claim 1, wherein the suspension medium comprises a saturated hydrocarbon comprising from 4 to 12 carbon atoms, or a mixture of saturated hydrocarbons comprising from 4 to 12 carbon atoms.

11. The process as claimed in claim 1, wherein the gaseous fraction is recirculated to the first reactor via a regulatable valve.

\* \* \* \* \*